Aug. 31, 1937.　　　G. C. SOULE ET AL　　　2,091,343
MATERIAL HANDLING EQUIPMENT
Filed Dec. 19, 1935　　　3 Sheets-Sheet 2
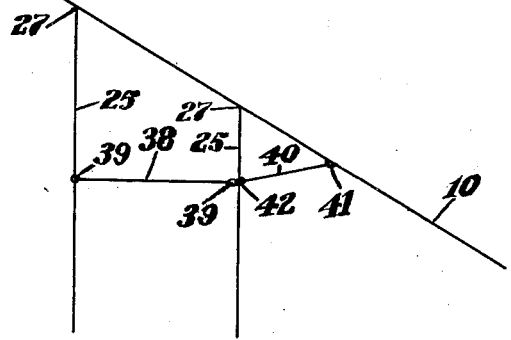
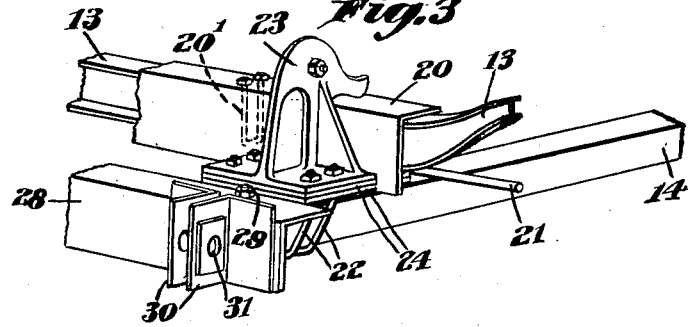
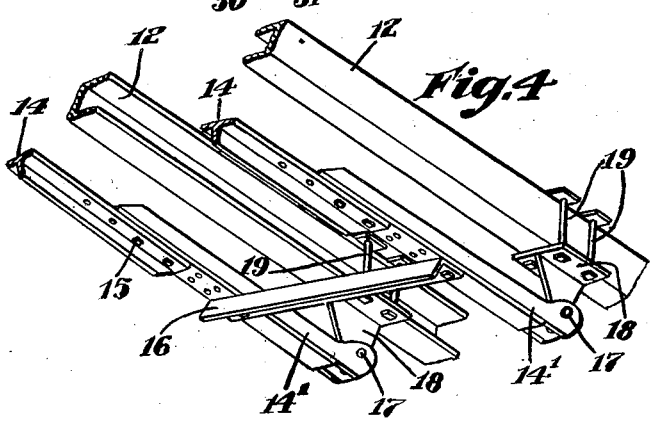
Inventors
George C. Soule
Carle D. Henry
By Ellis Spear Jr.
Attorney Aug. 31, 1937. G. C. SOULE ET AL 2,091,343
MATERIAL HANDLING EQUIPMENT
Filed Dec. 19, 1935  3 Sheets-Sheet 3
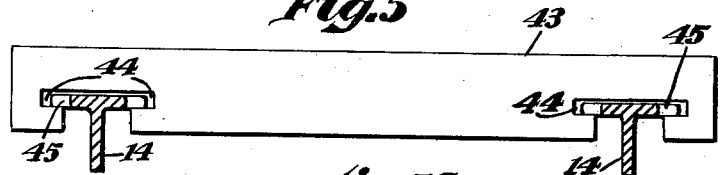
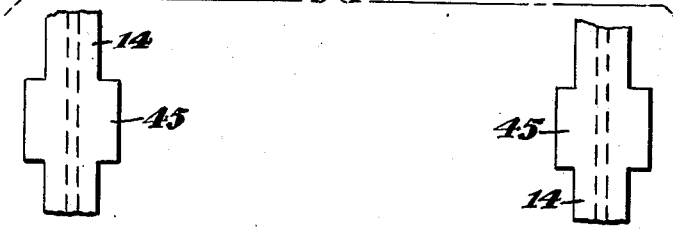
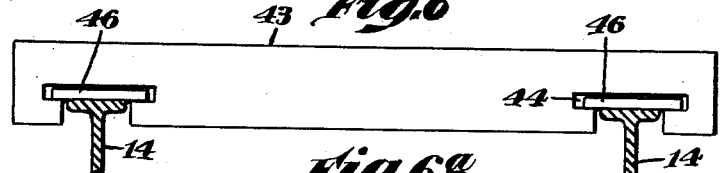
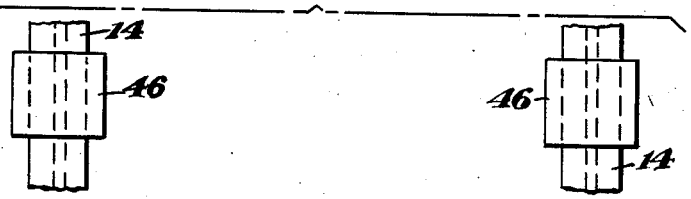
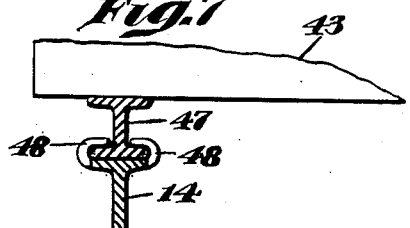
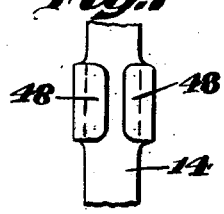
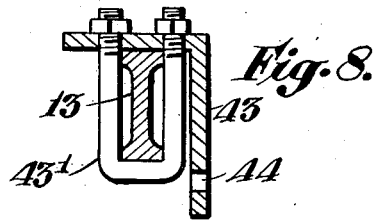
Inventors
George C. Soule
Carle D. Henry
By Attorney

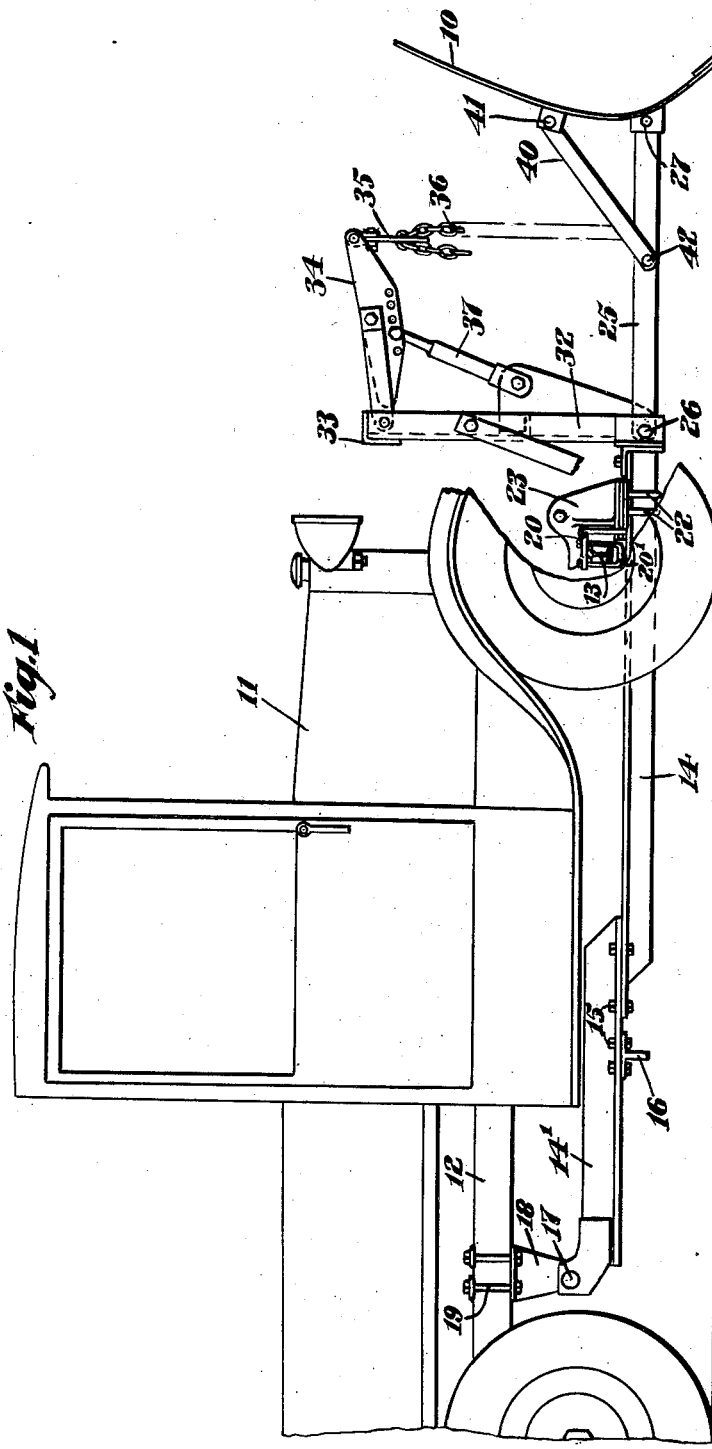

UNITED STATES PATENT OFFICE 2,091,343

MATERIAL HANDLING EQUIPMENT

George C. Soule and Carle D. Henry, South Portland, Maine

Application December 19, 1935, Serial No. 55,248

12 Claims. (Cl. 37—42)

Our present invention relates to improvements whereby snow plows or other material handling equipment may be more reliably pushed in front of motor trucks or other types of motive equipment of generally similar construction. It involves two general aspects, one relating to that portion of the pushing device which is more or less permanently attached to the truck and the other relating to that part of the pushing device which is permanently attached to the snow plow or other equipment.

Dealing first with the truck attachments.

A conventionally acceptable method of pushing implements in front of a truck is by means of an underframe so designed that the pushing strains are borne by the frame of the truck or by its rear axle while the weight of the plow when lifted is substantially carried on the front axle which stands no part of the push.

As commonly constructed the underframe consists of two longitudinally extending pipes, structural or other column members with their rear ends attached to the frame or rear axle of the truck and with their front ends passing underneath the front axle and slidably suspended from it.

This is an excellent method of pushing a snow plow because all pushing strains are kept away from the front axle and the front end of the frame which are the weaker portions of the truck, particularly of the smaller and lighter types.

It has however one serious handicap. The modern trend of truck development is toward drop axles in the front with a consequent reduction in ground clearance between the front axle and the surface of the road. Any type of push member sufficiently strong to stand the pushing power of the truck and passing under the front axle as in the underframe push acts still further materially to reduce this ground clearance.

In many models of trucks the use of an underframe reduces the ground clearance to perhaps three or four inches. This is not objectionable when plowing on a surfaced road but between storms the trucks are constantly being called on to go into sand pits and haul out sand for sanding the highways and to do other types of work which takes them off hard surfaced roads and forces them to travel over lower class roads which are rutted.

Under these conditions an underframe which seriously cuts down the ground clearance becomes a very objectionable handicap, often causing the truck to be hung up on its front axle under conditions which it could pass over with ease if its front axle ground clearance were not reduced by the underframe suspended under it.

Conventionally constructed underframes are supported to the front axle by bolted clamps or other semi-permanent methods of attachment which are slow, awkward, and expensive to detach.

With these considerations in mind, we have devised a device which makes it possible quickly and easily to detach the underframe by removing two pins and backing up the truck and to remount it by an equally simple reversed process, thereby reducing the time necessary for the change from hours to minutes, and avoiding the outstanding objection to the present more or less permanently fastened underframe push as regards serious reduction of ground clearance.

Such device may be either a rearwardly pointed hook over the front axle or a slidable connection between the push member and the axle or member mounted thereon which narrows and thereby disengages itself when the truck is moved backward with relation to it.

Regardless of the actual mechanical form which such device may take, it is essentially a device which will automatically disengage from the front axle upon movement of the front axle in a single direction longitudinally rearward with reference thereto. The disengaging movement, moreover, is a relatively slight or short movement; that is to say, the front axle does not have to be moved rearwardly any substantial distance, as for example, the entire length of the underframe. Nor does such disengaging movement have to be accompanied by a relative movement of the parts in some other direction, as for example, an upward or a lateral direction. Nor does such disengaging movement involve any tedious, inconvenient, or time-consuming removal of inaccessibly located bolts, pins, or similar fastenings from the front axle.

Considering next that part of the pushing mechanism which is permanently attached to the plow and which is made separate from that part commonly attached to the truck so that plows of different types can be interchanged without changing the underframe.

Conventional plow push members are either two parallel and independent forwardly pointing structural or other members or else are a frame composed of two such members with some type of cross bracing to give them resistance to side strain and greater strength as columns.

With the increased power of motor trucks it is impractical to depend on two independent members. Cross bracing is necessary to get strength without excessive weight.

With these considerations in mind, we have devised a flexibly braced connection for the snow plow or other material handling equipment, consisting of braces between the push members and from the push members to the plow mold board which have universal joints on each end so that while adequate cross bracing is provided to stand plowing strains and retain the push frame in shape there is no resistance to sufficient twisting of the push frame to permit the plow to follow the road or to permit the rear end of the plow to be hoisted considerably in advance of the front end and hence when completely lifted the two ends are equally distant from the road surface and the unequal action of the two radii on which they are lifted is restored to equality by twisting the push frame.

We have shown in the accompanying drawings embodiments of our invention which we have found highly satisfactory in use and well adapted to the requirements of modern snow plows and their propulsion vehicles together with several variants which clearly suggest the wide range of possible modification in order to meet the problems presented by the various types and makes of propulsion vehicles with which our attachments may be used.

In such drawings:—

Fig. 1 is a side view, partly broken away, of a conventional motor truck and snow plow pushed thereby and equipped with a quickly detachable underframe and flexibly braced push frame constructed and attached in accordance with our invention.

Fig. 2 is a diagrammatic indication of the flexible bracing of such push frame.

Fig. 3 is a fragmentary perspective illustrating one embodiment of our quickly detachable push frame, and particularly showing the method of attachment to the front axle of the truck or other propulsion vehicle.

Fig. 4 is a similar view but particularly showing from below the method of attachment of the push frame to the truck frame in the region of the rear axle of the truck, and Figs. 5, 5a, 6, 6a, 7, 7a and 8 are fragmentary views showing several possible variants to replace the open hook-like member illustrated in Fig. 3.

Considering first that part of the pushing mechanism which has heretofore been more or less permanently attached to the truck, we have indicated at 11 a motor truck or other propulsion vehicle, at 12 the frame or chassis of the truck, and at 13 the front axle of the truck, and at 14 the underframe push.

In accordance with usual practice, the underframe push consists of a pair of spaced longitudinally extending structural members 14. These may be sectional so as to permit them to be extended or shortened to fit various truck wheel bases and are so shown in these drawings.

When constructed as telescopic sections, each underframe push member 14 consists of a front section 14 and a rear section 14'. These are overlapped and fastened together by means of a plurality of bolts or equivalent fastenings 15. By changing the positions of the bolts in the various bolt holes, the sections may be shortened or lengthened as desired. Desirably, the sections are also cross-braced in the region of these bolts as by means of the angle member 16.

The rear ends of the rear sections 14' are detachably fastened as at 17 to depending hangers 18 which are clamped to the truck frame 12 in any desired manner as by means of the clamping bolts 19 (Fig. 4).

The forward ends of the forward sections 14 extend under the front axle 13 of the truck (Fig. 3) and under the conventional front axle angle member 20 and steering tie rod 21.

The front axle is attached in any usual manner to the angle member 20, as by means of the usual U-bolt clamps 20'.

Clamped to each underframe push member 14 forwardly of the front axle and angle member 20, as by means of the U-bolts 22, is a rearwardly pointed hook-like member 23. Shims or fillers 24 may be interposed between the base of each member 23 and the upper face of the section 14 on which said member rests. The hook members 23 pass over the front axle and its angle member 20 and support the weight of the underframe push members.

So long as the underframe push members are connected by means of the withdrawable pins 17 to the hangers 18 at their rear ends and with the front axle of the truck by means of the hook-like hangers 23 at their forward ends, the underframe push is maintained in fixed relation to the truck.

By withdrawing the pins 17 and backing up the truck, the front axle is withdrawn from under the hook members 23 and the truck is thereby completely freed from the underframe push, which can therefore no longer act as an obstruction to reduce ground clearance.

The front axle angle member 20 and front axle clamps 23 may be constructed and installed in various ways to suit the particular truck on which the plow is to be mounted. Ordinarily, the rearwardly pointing front axle clamps 23 are installed ahead of the front axle. Should the engine support or frame cross member interfere with such an installation, the front axle angle member 20 may be reversed, that is to say, may point forwardly instead of rearwardly as in Fig. 3. Any number of shims or fillers 24 may be used to build up under the axle member 20 and provide desired clearance. Preferably, such member 20 is slotted as illustrated in Fig. 3 to straddle each push frame member and thus hold the parts against side sway. There should be a clearance of from one-quarter inch to one-half inch between the top of the underframe push and the axle angle member 20 so that these parts will not bind when the rear end of the underframe push is disconnected from the rear axle clamps 18, dropped to the ground, and the truck backed out.

Considering now that part of the pushing mechanism which is permanently attached to the moldboard 10 of the snow plow or other material handling implement and which is made separate from the underframe push 14 so that equipment of different types can be interchanged without changing the underframe push, we have shown the push members 14, forwardly of the front axle clamps, as formed for quick detachable connection with the plow-attached push frame 25. Such frame 25 consists of a pair of spaced push bars 25 alined with the push members 14 and constituting forward extensions thereof. At their rear ends the push bars 25 have a hinge pin connection 26 with the forward ends of the underframe push members 14. At their forward ends the push bars 25 are fastened as at 27 to the moldboard 10. (See Fig. 1.)

Referring particularly to Fig. 3 it will be noted that the hinge pin connection 26 is provided by a cross angle member 28 which is bolted or otherwise fastened as at 29 to the forward end of each underframe push member 14. Forwardly of said push members 14 and in line therewith the angle member 28 is formed with two pairs of spaced ears 30 to receive the rear ends of the push bars 25, the same being pinned through the holes 31 of said ears by means of the hinge pins 26.

These pins are preferably tapered push pins. They not only fasten the push bars 25 to the push angle member 28, but they also fasten the conventional nose lifting frame 32 in place. Such frame consists of a pair of spaced vertically disposed members and a top cross member 33. At its upper end the frame 32 has a forwardly extending hanger arm 34 provided at its forward end with any suitable chain grab 35. From the chain grab 35 depends a pair of lifting chains 36 which are made fast at their lower ends to the push bars 25 whereby to raise the snow plow nose off the ground when the equipment is passing over bare ground or returning from work. Any usual hydraulic ram 37 is provided for accomplishing this raising and lowering action and the usual oil supply line (not shown) to such hydraulic ram is, of course, disconnected when the underframe push members 14 are disconnected at 17 and the truck backed out of the front axle clamps 23.

In order to adequately cross-brace the push frame 25 and at the same time permit it to twist when the plow is lifted we provide a system of flexible cross bracing designed to withstand the plowing strains without offering so much resistance to the twisting action of the push frame as to prevent the plow from following the road when at work or from having its two ends equally distant from the road surface when lifted.

This is illustrated diagrammatically in Fig. 2 wherein we have shown the mold board of a one-way plow placed diagonally across the front of the truck and attached at 27 to the forward ends of the push bars 25 and the push bars as cross-braced as at 38. The ends of the cross brace 38 are connected by means of universal joints 39 with the push bars 25. In addition, one of the push bars 25 is provided with a diagonal brace 40 extending from it to the moldboard. The ends of this diagonal brace are connected with the mold board and push bar, respectively, by means of universal joints 41 and 42.

New plows using our flexibly braced push frame 25 may be mounted on trucks with other types of underframe or trucks equipped with our quickly detachable underframe may be used with old plows that do not have the flexibly braced push frame. Each has its own advantages, but only by the use of the two in conjunction can the complete efficiency be realized.

As heretofore indicated it is possible to substitute other forms of front axle clamp for the rearwardly pointing hook-like members 23 shown in Figs. 1 and 3 and we have endeavored in Figs. 5, 5a, 6, 6a, 7, 7a and 8 to show some of the many possible variants of this phase of our invention.

Referring to Figs. 5 and 5a, which are, respectively, front and partial plan views of one of such variants, we have indicated at 43 a cross member normally adapted to be engaged with the front axle of the truck by any suitable fastening means as the U-bolts 43' (see Fig. 8). Adjacent each end thereof, the cross member 43 is provided with a T-slot 44. These slots receive the underframe push members 14 which in this embodiment of our invention are provided with relatively short areas 45 extending in fore and aft direction and slightly wider than the rest of the push members so as to project laterally over the side edges of the push members, and act as locking keys which engage in the T-slots 44 of the cross member 43. Normally the parts are retained in the locked position of Fig. 5 by the pin connection 17 of the underframe push members 14 with the truck frame.

In the variation of Figs. 6 and 6a, we attach to the upper face of the underframe push members 14 key members 46 corresponding in general purpose and use to the key members 45 of Fig. 5.

In the variation of Figs. 7 and 7a we attach to the underface of the cross member 43 a pair of T-rail sections 47 and form the underframe push members 14 with a pair of spaced inturned oppositely disposed engaging hooks 48 which slidably engage around the bottom or base of the T-rail 47.

Various other modifications in the construction and operation of our invention may be obviously restorted to if within the spirit and scope of our invention without departing from the limits of the appended claims.

What we therefore claim and desire to secure by Letters Patent is:—

1. In material handling equipment, a motor truck, an underframe push attachment comprising a pair of spaced push members disposed longitudinally of the vehicle beneath the same, a pair of hangers fastened to the truck frame, manually detachable means connecting the rear ends of said push members with said hangers, and a pair of rearwardly open members mounted on the forward ends of the push members and normally engaging the front axle of the truck but automatically and instantly releasable therefrom by simply disconnecting the rear ends of the push members from their hangers and moving the truck in a rearward direction leaving said push members stationary and substantially in place.

2. In material handling equipment, a motor truck, an underframe push attachment comprising a pair of spaced push members disposed longitudinally of the vehicle beneath the same, a pair of hangers fastened to the truck frame, manually detachable means connecting the rear ends of said push members with said hangers, and a pair of hook-like hangers mounted on the forward ends of the push members and normally engaging the front axle of the truck, the hooks of said hangers pointing in a rearward direction whereby on disconnecting the rear ends of the push members from their hangers and moving the truck in a rearward direction said hooks will be automatically and instantly freed from their engagement with said front axle.

3. In material handling equipment, a motor vehicle, a material handling implement adapted to be pushed thereby, an underframe push attachment interposed between said vehicle and implement, manually detachable means detachably connecting the rear end of said push attachment to the frame of said vehicle, automatically detachable means releasably connecting the forward end of said push attachment to the front axle of said vehicle and effective when the rear end of said push attachment is disconnected from the vehicle frame and the vehicle backed up automatically to disengage the front end of said push attachment from the front axle of the vehicle, an extension push frame carried by the material handling implement and alined with and pivotally connected with the forward end of said underframe push attachment, and a cross brace for said extension frame and flexibly connected therewith.

4. The combination of claim 3, with a diagonal brace flexibly connecting the extension push frame to the material handling implement.

5. The combination of claim 3, the extension push frame comprising spaced push bars, and the cross brace having universal joint connections at each end with said push bars.

6. The combination of claim 3, the extension push frame comprising spaced push bars, the cross brace having universal joint connections at each end with said push bars, and there being a diagonal brace having universal joint connections at each end with one of said push bars and the material handling implement, respectively.

7. In combination, a propulsion vehicle, a material handling implement pushed thereby, a pushing mechanism comprising an underframe push attached to and disposed beneath the vehicle and an extension push frame pivoted to the forward end of the underframe push and carried by the implement, manually detachable means detachably fastening the rear end of the underframe push to the vehicle frame, automatically detachable means suspending the forward end of the underframe push from the front axle of the vehicle and automatically releasable therefrom on disconnecting the rear end of the underframe push from the vehicle frame and moving the front axle longitudinally rearward, and means flexibly bracing the extension push frame forwardly of its pivotal connection with the underframe push.

8. The combination of claim 7, there being a diagonal brace flexibly connecting the extension push frame with the material handling implement.

9. In material handling equipment, a propulsion vehicle, an underframe push attachment therefor, a manually detachable connection between the rear end of said underframe push and the frame of the propulsion vehicle, and an automatically detachable connection between the forward end of said underframe push and the front axle of the propulsion vehicle normally engaged with said front axle but automatically and instantly releasable therefrom by simply disconnecting said manually detachable connection from the vehicle frame and moving the front axle of the vehicle longitudinally a distance sufficient to free said automatically detachable connection from its engagement with the front axle.

10. The combination of claim 9, the automatically detachable connection being a rearwardly open, forwardly closed, member having a portion adapted to overlie the front axle when the underframe push is connected to the front axle.

11. A quick detachable underframe push attachment for material handling equipment, comprising an underframe push member having a manually detachable connection adjacent its rear end for engagement with the frame of the propulsion vehicle and having an automatically detachable connection adjacent its forward end normally engaged with the front axle of the vehicle but automatically and instantly releasable therefrom by simply disconnecting the manually detachable connection from the vehicle frame and moving the front axle of the vehicle longitudinally rearward a distance not substantially greater than the distance of normal engagement between said front axle and said automatically detachable connection.

12. In material handling equipment of the vehicle propelled underframe push type, an automatically detachable connection for fastening the forward portions of the underframe push to the forward end of a propulsion vehicle, comprising a cross member carried by the propulsion vehicle, a pair of spaced T rail members rigidly fastened to said cross member, each push member having a pair of oppositely disposed inturned hook-like portions adapted to slidably engage the base of said T rail members when the underframe push is connected to the vehicle and to automatically disengage from said T rail members and permit instantaneous disconnection of the underframe push and cross members upon movement of said cross member longitudinally relative to said underframe push.

GEORGE C. SOULE.
CARLE D. HENRY.